Figure 5:
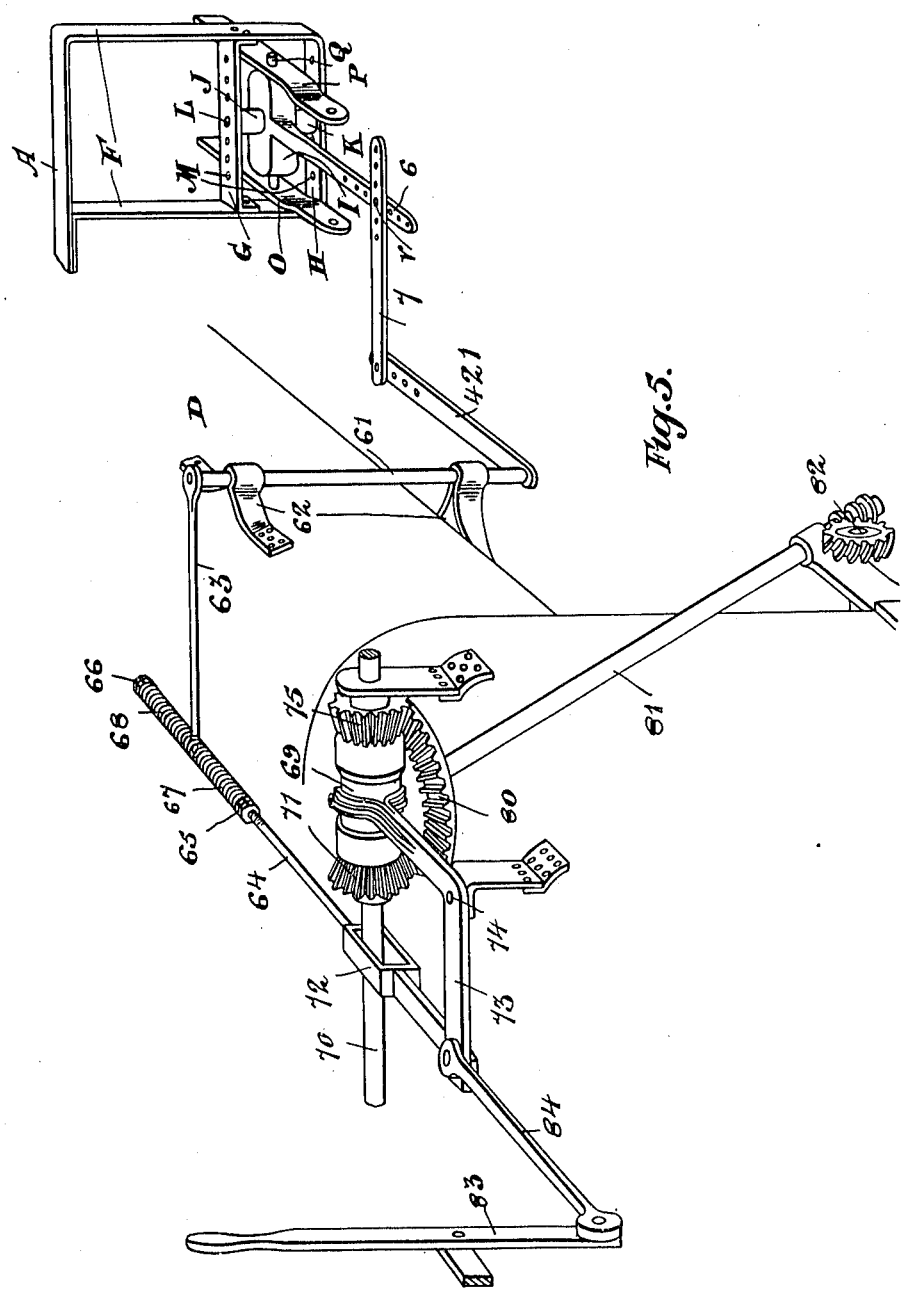

J. B. ROGERS.
AUTOMATIC STEERING DEVICE FOR TRACTION ENGINES.
APPLICATION FILED MAY 20, 1909.
950,604.
Patented Mar. 1, 1910.
2 SHEETS—SHEET 1.
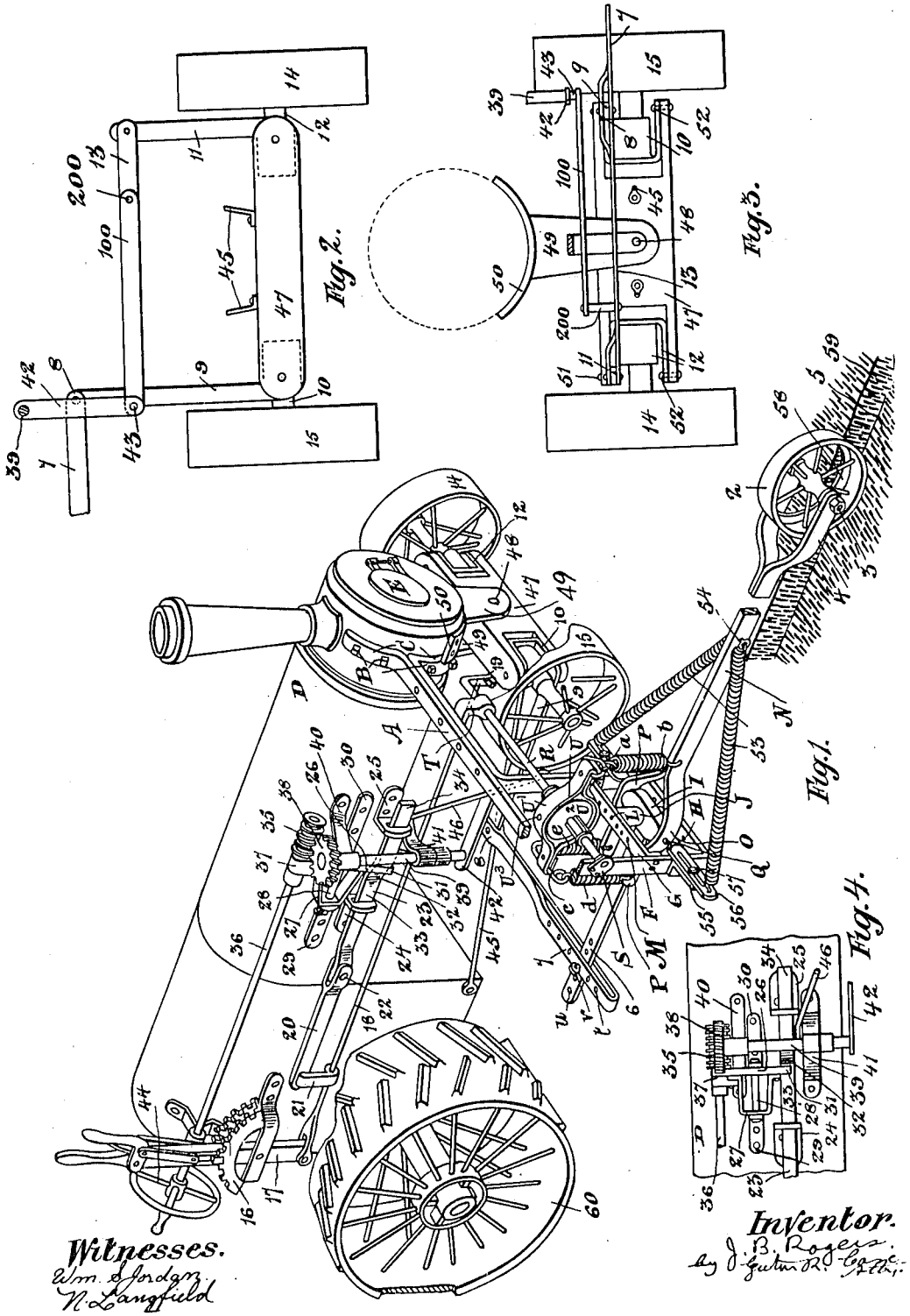
Witnesses.
Wm. S. Jordan
N. Langfield
Inventor.
J. B. Rogers J. B. ROGERS.
AUTOMATIC STEERING DEVICE FOR TRACTION ENGINES.
APPLICATION FILED MAY 20, 1909.

950,604.

Patented Mar. 1, 1910.
2 SHEETS—SHEET 2.

Witnesses.
Wm. S. Jordan.
N. Langfield

Inventor.
J. B. Rogers
by Cyrus R. Case
atty.

UNITED STATES PATENT OFFICE.

JOSIAH BARKER ROGERS, OF GAINSBOROUGH, SASKATCHEWAN, CANADA.

AUTOMATIC STEERING DEVICE FOR TRACTION-ENGINES.

950,604.  Specification of Letters Patent.  Patented Mar. 1, 1910.

Application filed May 20, 1909. Serial No. 497,351.

*To all whom it may concern:*

Be it known that I, JOSIAH BARKER ROGERS, a subject of the King of Great Britain, residing at Gainsborough, Province of Saskatchewan, Canada, have invented certain new and useful Improvements in Automatic Steering Devices for Traction-Engines, of which the following is a specification.

My invention relates to improvements in automatic steering devices for traction engines, and the principal object of my invention is to combine with a traction engine improved means which will operate in the last furrow, so as to automatically steer the engine so that the gang-plows drawn thereby will be operated to the best advantage in plowing.

Another object of my invention is to construct my device so that it may be thrown out of operation and the ordinary hand-steering mechanism be used, if desired.

A still further object of my invention is to construct a device of the class described so that it will follow the configuration of the last furrow respecting its side and bottom so that there will be no possible chance of the apparatus getting out of the furrow.

A still further object of my invention is to combine my device, in its preferred form, with a particular class of axle for the front wheels of the engine-truck, thereby making my apparatus much more sensitive in its operation than any of the similar devices now on the market, and the preferred construction of my invention, and its operation, will be hereinafter particularly described, and the parts I claim as new will be pointed out in the claims forming part of this specification.

Figure 1 is a perspective view of a traction engine, showing the same provided with my automatic steering device. Fig. 2 is a plan-view of the front truck for the engine showing my construction for connecting my steering device therewith. Fig. 3 is a rear elevation of the front truck for the traction engine. Fig. 4 is a side elevation of the construction whereby the hand steering mechanism is thrown into and out of gear with the automatic steering device, and Fig. 5 is a diagrammatic perspective view showing a suitable construction whereby my automatic steering device can be coupled up to a steam-steering gear.

In the drawings, like characters of reference indicate corresponding parts in each figure.

In plowing by traction engines, it requires considerable attention on the part of the operator to steer the engine in order to operate the plows to the best advantage, when the engine is not provided with an automatic steering device, and the chief object of my invention is to reduce to a minimum the amount of attention required of the engineer in the steering of the engine during plowing operations. Now in order to realize my desire in a commercial way it is most desirable that the front truck of the traction engine be constructed so that the steering device may easily operate the front wheels in order that they may readily respond to the changes in the path of movement of the steering device itself.

My preferred form of construction for my device consists of a suitable frame A which is detachably secured by suitable fastening means, such as bolts and nuts B, passing through its inner ends C, to the engine-boiler D. As the door E can be readily opened, the compartment in the head of the boiler can be readily entered in order to remove the frame A, or secure it in place.

Secured to the uprights F of the frame A is a cross-bar G. Pivoted in this cross-bar and in the bottom plate H of the frame A, is a head I. Secured to, or formed a part of, the head I are bosses J and K through which extend the bolt L. The bolt L is removable, and by means of the holes M formed in the cross-bar G and the bottom plate H, the position of the head I can be adjusted, either toward or away from the engine.

N is a tongue provided with a bifurcated inner end O, through the sides P of which pass the studs Q which are carried by the head I. By the construction just described it will be understood that the tongue N is pivoted to the said head, and that it not only has movement around the said studs, but that it also has movement around the bolt L, thus giving the said tongue a wide range of movement.

Feathered on the rock-bar R (which rock-bar is mounted in the brackets S and T, carried respectively by one of the uprights F and the frame A), is a rocking beam U, comprising the frame $U^1$ and the block $U^2$. Carried by the front end of the rocking frame U¹ is a link $a$ to which is fastened a coiled spring $b$ which is also connected with the tongue N. Carried by the rear end of the rocking frame U¹ is a compound link $c$, to each end of which are connected coiled springs $d$ and $e$. These coiled springs $d$ and $e$ are secured at their lower ends to the ends of the sides P of the bifurcated or forked end O of the tongue N. When the rock-bar R is operated, as hereinafter described, the rocking beam U will be moved so as to extend the springs $d$ and $e$ thus exerting force against the ends of the sides P of the bifurcated or forked end O of the tongue N so that the pilot wheel 2 (mounted by its axle 3 in the sides of the forked end 4 of the tongue N) and the tongue N will be moved around the studs Q so that the said pilot wheel will be caused to positively follow the configuration of the bottom of the furrow 5, thus preventing any tendency of the pilot wheel 2 to run out of the said furrow. The force exerted by the said springs will also enable the pilot wheel 2, together with its weight and the weight of the major portion of the tongue N, to more or less crush the loose soil in the bottom of the furrow, and so prevent any lumps from accidentally causing the pilot wheel to get out of the furrow. One function of the spring $b$ is to prevent the tongue N and its pilot wheel 2 from moving down too far, as the said spring will exert tension against the tongue N should the pilot wheel fall into a very deep rut or hole, and thus prevent the pilot wheel from going so far into said hole or rut as to interfere with the action of the device.

Extending from the head I is a tongue 6. Adjustably coupled to the tongue 6 is a cross-bar 7, the inner end 8 of which is pivoted to the lever 9 secured to, or formed part of the stub-axle 10 mounted in the front truck.

11 is a lever secured to, or formed a part of, the stub-axle 12, and this lever 11 is connected to the lever 9 by the link-rod 13.

Now from the construction just described, it will be understood that as the lateral change of direction of the pilot wheel 2 takes place, the front wheels 14 and 15, will be moved in order that the engine may be steered so as to follow in the desired direction.

16 is any suitable quadrant secured to the side of the boiler D, and pivoted to this quadrant is a lever 17. In order to operate the rock-bar R in order to put the springs $d$ and $e$ under tension and so lower the tongue $n$ (as before described), the lever 17 is swung forward, thus drawing the rod 18 backward, and through the connection 19 which the rod 18 has with the rock-bar R, the said rock-bar is operated.

It will be understood that at times the steering device will not be of any service; this is particularly the case when the traction engine is going along the roadway. Now in order to elevate the tongue N and its pilot wheel 2, all that is necessary for the engineer is to throw the lever backward, and through the rod 18 and its connection with the rock-bar R it will be understood that the rocking beam U will be rocked backward, thereby through the spring $b$ moving the tongue N around the studs Q and so elevating it and the pilot wheel 2. When the lever 17 is moved backward in order to elevate the tongue N, as just described, it throws into gear the hand-steering mechanism so that the wheels of the front truck can be operated by hand to steer the engine.

20 is a bar supported by its arm 21 from the rod 18. Pivoted to the front end of the bar 20 at 22, is a latch-plate 23 which is held in the slotted brackets 24 and 25 carried by the boiler D.

26 is a rock-lever provided with an extension 27. The rock-lever 26 and extension 27 are mounted on a rod 28 which has bearing in the brackets 29 and 30, carried by the boiler D. The lower end 31 of the rock-lever 26 is bifurcated and straddles the latch-plate 23. Now when the lever 17 is thrown backward thus throwing forward the rod 18, the bar 20 and latch-plate 23 are of course also advanced, and as the latch-plate 23 is provided with a bent portion 32, which forms the latch-plate into middle and end portions 33 and 34, the first-mentioned portion being nearer to the boiler, it naturally follows that the lower end 31 of the rock-lever 26 is moved toward the boiler D, and so moves the worm 35 (carried by the shaft 36 which has bearing in the upper end 37 of the rock-lever 26) into mesh with the worm wheel 38, carried by the shaft 39 which has bearing in the brackets 40 and 41 secured to the boiler D. Secured to the lower end of the shaft 39 is a link-rod 42 which is connected by the coupling 43 with the link-rod 100 which link-rod is in turn connected by the coupling 200 with the link-rod 13. By means of the hand-steering wheel 44 carried by the shaft 36, it will be understood that the worm-gear before described, is operated, and through the link-rods 42 and 13 and the connections between the link-rod 13 and the stub-axles 10 and 12, the traction engine is manually steered. When the lever 17 is thrown forward, through the connection before described the latch-plate 23 is of course drawn backward, thus moving the bent portion 32 so as to throw outward the lower end 31 of the rock-lever 26 and so throw the worm 35 out of mesh with the worm gear 38. This movement of the lever just described at the same time it throws the worm-gear out of mesh, of course lowers the tongue N and the pilot wheel 2, as will be clearly understood.

45 are any suitable brace rods for the front truck, and 46 is any suitable brace rod for the frame A.

In place of having the ordinary axle in the front truck of the traction engine, I have found that by mounting the wheels of the front truck on the stud-axles, that my steering device has better control in steering the traction engine. In order to provide for inequalities of the roadway, I have pivoted the axle-member 47 by the bolt 48 to the standards 49 which are secured by the plate 50, to the front end of the boiler D. It will be seen that the said axle-member is positioned between the standards 49, and that there is sufficient room between said axle member and the boiler in order to permit of the movement of said axle member on the bolt 48. The said axle member is recessed at each end so as to receive the stub-axles 10 and 12, which are pivoted by the bolts 51 and 52 to said axle member.

The tongue 6 and cross-bar 7 are provided with holes $t$ and $u$ respectively, so as to permit of adjustment.

$v$ is a bolt by means of which the tongue 6 and bar 7 are held in relationship.

When the position of the head I is changed, it will be understood that there must be a corresponding adjustment of the tongue 6, and the construction before described is provided for that purpose. As the block $U^2$ of the rocking beam U is feathered on the rock-bar R, it will be understood that it can be longitudinally adjusted thereon to properly place it when the head I has been adjusted. By means of the studs or pins $U^3$ (one only of which is shown) the rocking frame $U^1$ is swiveled to the block $U^2$ so that the said rocking frame will have movement so as not to interfere with the lateral movement of the tongue N, and yet not interfere with the sliding of the block $U^2$ on the rock-bar R.

The normal position of the tongues N and 6 will be parallel to the line of movement of the traction engine, and in order to maintain these tongues in this position, and yet allow of the lateral movement of the tongue N, I provide the coiled springs 53 which are connected at their front ends to the tongue N by the bolt 54.

55 are brackets carried by the uprights F, and supported from these brackets are slotted plates 56 through which pass the bolts 57 which hold said slotted plates in their adjusted position to the brackets 55. The rear ends of the springs 53 are connected to the slotted plates 56. It will be understood without further explanation that the springs 53 are at rest in the position shown in Fig. 1. Any tendency on the part of the tongue N to move laterally will be resisted by either of the springs, and thus tend to keep the said tongue in the desired position.

As my steering device will be constructed so as to be applied to different makes and sizes of traction engines, it will be understood that there must be more or less adjustment, and in order that the necessary adjustment may be had, I have constructed my device as before set forth. Now when the position of the head I is adjusted, there must be a corresponding adjustment of the slotted plates 56 so as to equalize the strain of the springs 53 on the tongue N, as will be understood.

The pilot wheel 2 is preferably provided with an inner flanged edge 58, so that the said wheel may operate against the wall 59 of the furrow 5 without unduly cutting into the same.

60 are the drive wheels, and of course any suitable driving mechanism (not shown) is provided for the same.

When the lever 17 is operated to elevate the tongue N and so throw into mesh the worm-gear, it will be understood that while the tongue N and its connected parts will be moved laterally during the manual steering of the traction-engine, still it must be understood that the parts of my device are so constructed as not to interfere in the slightest with this manual steering.

In Fig. 5 I show a diagrammatic view, in perspective, of my automatic steering device combined with a steam-steering gear. In adapting my automatic device to a steering gear of this class, I secure the link-rod 421 to a rock-bar 61 mounted in the brackets 62 secured to the boiler D. Carried by the upper end of the rock-bar 61 is an arm 63 through the free end of which passes the rod 64. The rod 64 projects a considerable distance beyond the free end of the arm 63, and carries two pairs of lock nuts 65 and 66. Between the lock nuts 65 and the free end of the arm 63 and on the rod 64, is placed a coiled spring 67, and on the same rod and between the free end of the arm 63 and the nuts 66, is a coiled spring 68. When the tongue N receives lateral movement, this is transmitted by the tongue 6 to the cross-bar 7, and thence to the link-rod 421. The rock shaft 61 then operates the arm 63 and either moves forward or backward the rod 64. According to the drawing, the friction clutch 69, mounted on the drive shaft 70, is out of clutch with either of the bevel pinions 71 and 75 loosely mounted on the drive-shaft 70. If the rod 64 be moved outward, the connection 72 will operate the friction clutch lever 73 around its pivot 74 and so couple the friction clutch 69 with the bevel pinion 75, thus operating the bevel wheel 80, and through its shaft 81 and the worm-gear 82, turn the front truck (not shown) in the desired direction. If the rod 64 be moved inwardly, the friction clutch 69 will be unclutched from the bevel pinion 75 and thrown into clutch with the bevel pinion 71 and so operate the bevel wheel 80 and its connected parts in the other direction so as to change the direction of movement of the traction engine. By reason of the springs 67 and 68, or equivalent construction, it will be understood that the engineer, through the medium of the hand-lever 83 and connecting lever 84, can manually throw into, and out of clutch, the friction-clutch 69, without my device in any way interfering with this operation.

While I have described what I consider to be the best embodiment of my invention, I desire it to be understood that the principles can be embodied in different forms, and I desire not to be limited beyond the requirements of the prior art, and the terms of my claims.

Although I have illustrated the springs 53 in connection with my preferred form of invention, still it must be understood that they are more particularly adapted for use with my steering device when I use it in connection with the steering mechanism illustrated in Fig. 5.

In actual practice the tongue N may continue in its lateral movement after it has operated the rod 64 and its connected parts in order to throw the friction-clutch 69 into gear with either of the bevel-gears 71 or 75, and in order to allow of this overthrow movement, I have employed the springs 67 and 68. After the rod 64 has been operated to move the clutch so as to operate either of the bevel-gears associated therewith, the further movement of the arm 63 will be permitted by either of the springs 67 and 68, and thus prevent the action of any jamming force against the friction-clutch.

What I claim as my invention is:

1. In a traction engine, the combination with the front wheels mounted in stub axles, of a frame carried by said engine; a tongue mounted in said frame; means whereby said tongue is permitted to have vertical and lateral movement; a pilot wheel carried by said tongue and designed to run in the last furrow made, and means connecting said tongue with the said wheels, as and for the purpose specified.

2. In a traction engine, the combination with the front wheels mounted in stub axles, of a frame carried by said engine; a head pivoted in said frame; a tongue pivoted on said head; a pilot wheel mounted in said tongue; means connecting said tongue with said wheels, and means for raising and lowering said tongue.

3. In a traction engine, the combination with the front wheels mounted in stub axles, of a frame carried by said engine; a head pivoted in said frame; a tongue pivoted on said head; a pilot wheel mounted in said tongue; means connecting said tongue with said wheels; a rock-bar mounted in said frame; a rocking beam splined on said rock-bar and constructed to have pivotal movement thereon; springs carried by said rocking beam and connected with said tongue, and means whereby said rock-bar is operated so as to raise and lower said tongue.

4. In a traction engine, the combination with the front wheels mounted on stub axles; a shaft; brackets carried by the engine in which said shaft has bearing; a worm wheel mounted on said shaft, and means connecting said shaft with the stub axles of said wheels, of an automatic steering device connected with said stub-axles and designed to operate in the last furrow made; means for raising and lowering said automatic steering device; a worm; a shaft for said worm; a movable bearing for said shaft, and means intermediate said movable bearing for said shaft, and said means for raising and lowering said automatic steering device whereby when said means is operated to elevate said steering device and so throw it out of operation, said worm will be thrown into mesh with said worm wheel so that the engine may be steered by hand power.

5. In a traction engine, the combination with the front wheels mounted on stub axles; a shaft; brackets in which said shaft has bearing; a worm wheel mounted on said shaft, and means connecting said shaft with the stub axles of said wheels, of a frame carried by said engine; a head pivoted in said frame; a tongue pivoted on said head; a pilot wheel mounted in said tongue; means connecting said tongue with said wheels; a rock-bar mounted in said frame; a rocking beam splined on said rock-bar and constructed to have pivotal movement thereon; springs carried by said rocking beam and connected with said tongue; a rod connected with said rock-bar which when operated forward elevates said tongue and its pilot wheel, thus throwing the automatic steering mechanism out of operation; a worm; a shaft on which said worm is mounted; a movable bearing for said shaft, and means intermediate said movable bearing and said rod whereby when said rod is operated to elevate said tongue, the said worm is thrown into mesh with the said worm wheel so that the engine may be manually steered.

6. In a traction engine, the combination with the front wheels mounted on stub axles; a shaft; brackets carried by the engine in which said shaft has bearing; a worm wheel mounted on said shaft, and means connecting said shaft with the stub axles of said wheels, of a frame carried by said engine; a head pivoted in said frame; a tongue pivoted on said head; a pilot wheel mounted in said tongue; means connecting said tongue with said wheels; a rock-bar mounted in said frame; a rocking beam splined on said rock-bar and constructed to have pivotal movement thereon; springs carried by said rocking beam and connected with said tongue; side springs carried by said frame and connected with said tongue in order to maintain the same in the line of draft; a rod connected with said rock-bar which when operated forward elevates said tongue and its pilot wheel, thus throwing the automatic steering mechanism out of operation; a worm; a shaft on which said worm is mounted; a movable bearing for said shaft, and means intermediate said movable bearing and said rod whereby when said rod is operated to elevate said tongue, the said worm is thrown into mesh with the said worm wheel so that the engine may be manually steered.

7. An automatic steering device for traction engines comprising a frame; a head adjustably pivoted in said frame; a member projecting behind said head and connected therewith; a tongue pivoted to said head; a pilot wheel mounted in said tongue; a rock-bar mounted in said frame; a member splined on said rock-bar and mounted to have also pivotal movement thereon, and springs carried by said member and connected with said tongue.

8. An automatic steering device for traction engines comprising a frame; a head adjustably pivoted in said frame; a member projecting behind said head and connected thereto; a tongue pivoted to said head; a pilot wheel mounted in said tongue; a rock-bar mounted in said frame; a rocking beam comprising a block splined on said rock-bar and a rocking frame pivoted to said block, and springs connecting said rocking frame with said tongue.

9. An automatic steering device for traction engines comprising a frame; a head adjustably pivoted in said frame; a member projecting behind said head and connected thereto; a tongue pivoted to said head; a pilot wheel mounted in said tongue; a rock-bar mounted in said frame; a rocking beam comprising a block splined on said rock-bar and a rocking frame pivoted to said block; springs connecting said rocking frame with said tongue; adjustable brackets carried by said frame, and a coiled spring carried by each of said brackets and attached to said tongue.

10. In a traction engine, the combination with the front truck thereof, of a frame carried by said engine; a tongue pivoted in said frame; means connecting said tongue with said truck, and means whereby said tongue is put under tension so that it will positively operate in the bottom of the last furrow made.

11. In a traction engine, the combination with the wheels of the front truck; stub axles on which said wheels are mounted; a shaft; brackets carried by said engine in which said shaft has bearing; a worm-gear carried by said shaft, and means intermediate said shaft and the said stub axles, of a worm; a shaft on which said worm is mounted; a movable bearing for said shaft; means whereby said movable bearing is mounted on said engine; a lever, and means intermediate said lever and said movable bearing whereby said worm is thrown into and out of mesh with the said worm gear.

12. In a traction engine, the combination with the front wheels mounted on stub-axles, and a worm-steering-gear connected with said stub-axles, of an automatic steering device connected with said stub axles and designed to operate in the last furrow made, and means whereby when said automatic steering device is thrown out of operative position, the said worm-steering-gear will be thrown into mesh so that the engine may be manually steered.

13. In a traction engine, the combination with the front wheels mounted on stub-axles, and a worm-steering-gear connected with said stub-axles; of an automatic steering device comprising a frame carried by said engine; a tongue pivoted in said frame; means connecting said tongue with said stub-axles in order that the engine may be automatically steered, and means whereby when said tongue is thrown out of operative position, the said worm-steering-gear will be thrown into mesh so that the engine may be manually steered.

14. In a traction engine, the combination with the front wheels mounted on stub-axles, and a worm-steering-gear connected with said stub-axles; of an automatic steering device comprising a frame carried by said engine; a tongue pivoted in said frame; means whereby said tongue is put under tension so that it will positively operate in the bottom of the last furrow made; means connecting said tongue with said stub-axle in order that the engine may be automatically steered, and means whereby when said tongue is thrown out of operative position, the said worm-steering-gear will be thrown into mesh so that the engine may be manually steered.

15. In a traction engine, the combination with the front wheels mounted on stub axles, and a worm-steering-gear connected with said stub-axles; of an automatic steering device comprising a frame carried by said engine; a head pivoted in said frame; a tongue pivoted on said head; a pilot wheel mounted in said tongue; means connecting said tongue with said wheels, and means whereby when said tongue is thrown out of operative position, the said worm-steering-gear will be thrown into mesh so that the engine may be manually steered.

16. In a traction engine, the combination with the front wheels mounted on stub-axles, and a worm-steering-gear connected with said stub-axles; of an automatic steering device comprising a frame carried by said engine; a head pivoted in said frame; a tongue pivoted on said head; a pilot-wheel mounted in said tongue; means connecting said tongue with said wheels; means whereby said tongue is put under tension so that it will positively operate in the bottom of the last furrow made, and means whereby when said tongue is thrown out of operative position, the said worm-steering-gear will be thrown into mesh so that the engine may be manually steered.

17. In a traction engine, the combination with the front wheels mounted on stub-axles, and a worm-steering-gear connected with said stub-axles; of an automatic steering device comprising a frame carried by said engine; a head pivoted in said frame; a tongue pivoted on said head; a pilot-wheel mounted in said tongue; means connecting said tongue with said wheels; means whereby said tongue is put under tension so that it will positively operate in the bottom of the last furrow made, and springs carried by said frame and attached to each side of said tongue in order to keep same parallel at the desired line of draft.

In testimony whereof I have affixed my signature in presence of two witnesses.

JOSIAH BARKER ROGERS.

Witnesses:
   N. LANGFIELD,
   WM. S. JORDAN.